United States Patent
Garza et al.

(10) Patent No.: US 9,069,632 B2
(45) Date of Patent: Jun. 30, 2015

(54) MESSAGE PROCESSING

(75) Inventors: Jose E. Garza, Richmond (GB); Stephen J. Hobson, Hampton (GB)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 13/209,623

(22) Filed: Aug. 15, 2011

(65) Prior Publication Data
US 2012/0054775 A1    Mar. 1, 2012

(30) Foreign Application Priority Data
Aug. 26, 2010  (EP) .................................... 10174102

(51) Int. Cl.
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |

(52) U.S. Cl.
CPC ................ G06F 9/546 (2013.01); G06F 9/466 (2013.01)

(58) Field of Classification Search
CPC .................................. G06F 9/546; G06F 9/466
USPC .......................................................... 719/314
See application file for complete search history.

(56) References Cited

U.S. PATENT DOCUMENTS

| 5,167,035 A | * | 11/1992 | Mann et al. ..................... 714/4.1 |
| 6,529,932 B1 | * | 3/2003 | Dadiomov et al. ........... 718/101 |
| 7,406,523 B1 | * | 7/2008 | Kruy et al. ..................... 709/227 |
| 2005/0102261 A1 | * | 5/2005 | Todd ................................. 707/1 |
| 2008/0098044 A1 | * | 4/2008 | Todd .............................. 707/202 |
| 2008/0294714 A1 | | 11/2008 | Garza et al. |
| 2008/0317051 A1 | * | 12/2008 | Dantzig et al. ................ 370/401 |
| 2009/0144338 A1 | * | 6/2009 | Feng et al. ..................... 707/201 |
| 2010/0211953 A1 | * | 8/2010 | Wakeling et al. ............. 718/102 |

* cited by examiner

*Primary Examiner* — Timothy A Mudrick
(74) *Attorney, Agent, or Firm* — Winstead, P.C.

(57) ABSTRACT

A method, system and computer program product for operating a transaction manager. An invocation to begin a transaction as well as a message sequence number for the transaction are received. It is then determined if the message sequence number is greater than the last processed message sequence number. If the message sequence number is greater than the last processed message sequence number, then the transaction is started. Otherwise, if the message sequence number is not greater than the last processed message sequence number, then the transaction is failed.

12 Claims, 4 Drawing Sheets

MESSAGE PROCESSING

CROSS-REFERENCE TO RELATED APPLICATIONS

This application claims priority under 35 U.S.C. §119(a) from European Patent Application No. 10174102.3, filed on Aug. 26, 2010, the contents of which are incorporated herein by reference.

TECHNICAL FIELD

The present invention relates to operating a transaction manager and the transaction manager itself, and more particularly, to providing a new transactional model for asynchronous messaging clients.

BACKGROUND

In messaging systems, the use of messages and message queues in a wider network provide an asynchronous communications protocol, which means that the sender (a producing application) and the receiver (a consuming application) of a message do not need to interact with a message queue at the same time. Messages placed onto a queue are stored until a recipient retrieves them. Such networks support the passing of messages between different computer systems, connecting multiple applications and multiple operating systems. Messages can also be passed from queue to queue in order for a message to reach the ultimate desired recipient. An example of a commercial implementation of such a messaging software is IBM's WebSphere® MQ, previously MQSeries®. (IBM, WebSphere and MQSeries are trademarks of International Business Machines in the United States, other countries, or both.)

Message-oriented middleware usually offers a once-and-once-only delivery quality of service. It can be difficult and expensive to implement this quality of service in a high-throughput high-availability configuration because a component (e.g., a queue manager) which delivers the messages to a client is a single point of failure. If a component within the delivering mechanism is duplexed (or more), then complex synchronization protocols are required for preventing double (or more) delivery of the same message. Once-and-once-only delivery is usually only required when the message recipient (the consuming application) performs some work that must be done once-and-once-only. Typically, such consuming applications are transactional and include the middleware's delivering component as a resource manager in their transactions.

One high availability message transmission system of the art uses at least one of a plurality of message transmitters to achieve high availability message transmission. The plurality of message transmitters are each operable to transmit a message to a subscriber. In accordance with a determination, for example, of the value of the connections, the message is copied and transmitted to the plurality of the message transmitters so that at least one of the plurality of message transmitters transmits the copy to the subscriber. The at least one message transmitter may be selected by analyzing the message and determining an associated rule based on characteristics of the message. This system provides duplexing within the message delivery mechanism.

It is apparent that duplexing a delivering component within a transaction inevitably requires a distributed two-phase commit transaction even if no other resource managers are involved. Additional complexities arise in the middleware because either both (or more) of the delivering components themselves need to receive their copy of each message exactly simultaneously (that is, within a distributed two-phase commit transaction), or the delivering components need to keep track of messages which they have not yet received but which they have (in effect) already delivered. There are several known designs for high-throughput high-availability message-oriented middleware that resolve these issues by having a consumer-side component (e.g., a client) that detects and discards any second or subsequent delivery of the same message, as discussed above. However, these designs require the consumer-side component to track which messages the consuming application has already processed.

BRIEF SUMMARY

In one embodiment of the present invention, a method of operating a transaction manager comprises receiving an invocation to begin a transaction. The method further comprises receiving a message sequence number for the transaction. Additionally, the method comprises checking, by a processor, that the message sequence number is greater than a last processed message sequence number. Furthermore, the method comprises starting the transaction in response to the message sequence number being greater than the last processed message sequence number. In addition, the method comprises failing the transaction in response to the message sequence number not being greater than the last processed message sequence number.

Other forms of the embodiment of the method described above are in a computer program product and in a system.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
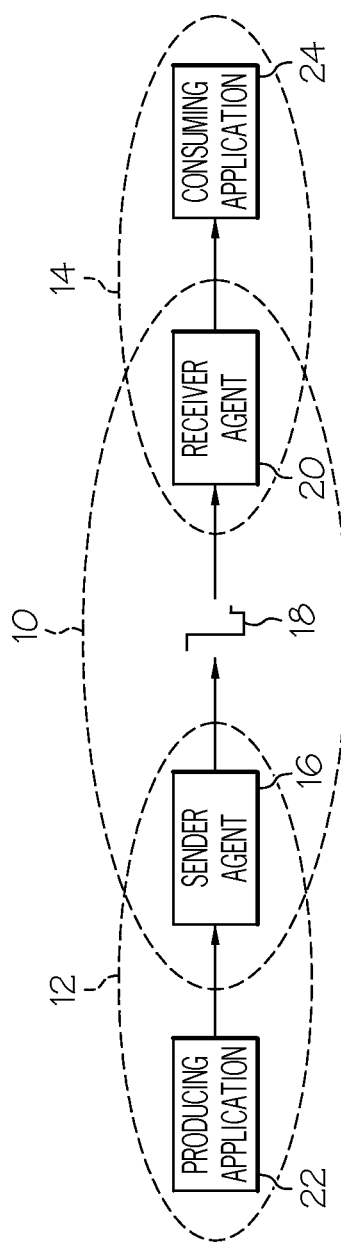
FIG. 1 is a schematic diagram of a system for processing a message in accordance with an embodiment of the present invention.

By implementing the principles of the present invention, it is possible to provide a transaction manager that can be used within a messaging system that can, for example, support duplex queues, while being able to deal efficiently with the double delivery of messages to a consuming application. The provision of the message sequence number included in each message allows the transaction manager to track the processing of the messages by a consuming application in a manner that is easy to implement and requires little or no change to the operation of the consuming application or the receiving agent. This means that the messaging system can use duplex queues, for example, with the advantages that this entails, without the negative effect of a consuming application having to handle the double delivery of messages or the receiving agent having to handle the message sequence numbers and provide a persistent store for recording such numbers. Only relatively small changes are required to the agents within the messaging system and the transaction manager, in order to provide a working solution to the problems of duplex queues, without placing any additional burdens on the consuming application or the receiving agent.

A high availability configuration for messaging systems with once-and-once-only delivery can be achieved by having the messaging agent at the sending application assign contiguous sequence numbers to messages and having the transaction manager remember the last-processed sequence number for each sending application. The core idea is to add the capability to the transaction manager, which allows the application to delegate responsibility for remembering the originator and sequence number combination (or suitable variant) to the transaction manager. The information is roughly similar in size to a transaction ID and can be stored by the transaction manager using the same technology as it uses for the transaction ID.

In one embodiment, following the failing of the transaction by the transaction manager, the consuming application performs the further step of deleting the message from the queue. If the transaction manager ascertains that the message has already been processed, via reference to the message sequence number of the specific message, then it is advisable to have a simple process to delete the particular message from the queue where it is currently located. This can be carried out by the consuming application either directly or through an agent of the messaging system.

Advantageously, the transaction manager performs the further step of recording the message sequence number and a decision to complete or backout the transaction as a single write to a log. The transaction manager records the message sequence number with the decision (complete or back out) for each transaction on a log. This is in case the receiving system fails before the consuming application invokes the deletion of the message, through a receiver agent, for example. The log provides a simple method of tracking the decisions in respect of the individual messages within the system. Additionally, by performing the action as a single write to a log, further protection is given against any failure. Since the transaction manager will have to record the decision concerning the transaction in its persistent store (the log), a suitable store is already available and the action is not split between two different locations. If a transaction decision was to be recorded in one place and the message sequence number in a second place, then a complicated commit procedure would be required in case there was any failure or error occurring between the two actions taking place.

In one embodiment, the message further includes an originator identifier and the consuming application performs the further step of passing the originator identifier to the transaction manager. In general, in such message handling systems, there will be multiple producing applications that produce the messages for consumption by the consuming applications. It is therefore advisable to track messages in such a way that the message sequence numbers are specific for the different originating applications. This is achieved by the use of an originator identifier as well as the message sequence number. The originator identifier is then also supplied to the transaction manager and the checking process in respect of the message sequence number carried out by the transaction manager is specific to the respective originating application.

The use of originator identifiers means that it is advantageous that the transaction manager performs the further steps of detecting that there is no message sequence number stored for the identified originator, and, in response, storing the message sequence number for the identified originator. Should the transaction manager receive a message sequence number for an unknown originating application, then the transaction manager can simply start recording the message sequence numbers for that specific new originating application. The current transaction will be started and all future transactions for messages with message sequence numbers for that originating application will be handled in the same way by the transaction manager, with a check made against the stored message sequence number and the transaction either started or failed as appropriate.

In one embodiment, the transaction manager performs the further steps of detecting that the message sequence number is greater than one more than the last processed message sequence number and reporting a missing message sequence number. In addition to detecting that a message has been already processed, the transaction manager can also be configured to detect that a message has not been processed and/or is missing. For example, if the message sequence number is 17 and the last processed message sequence number is 15, then the message with sequence number 16 has not been processed and can be assumed to be missing. The transaction manager can report this to other components in the system, either to store the information or to trigger an error condition, for example.

Advantageously, the transaction manager performs the further steps of detecting that the message sequence number is equal to a message sequence number for an invoked transaction that is not yet complete and reporting a busy code. The message sequence number received by the transaction manager may relate to a message for which a transaction has already been started but not yet completed, for example, through a two-phase commit. The transaction manager will not start a new transaction in this situation, as the message sequence number received will be not be greater than one already stored. However, it can be useful to report a busy code in this situation as this can be used by the consuming application or other components on the consuming side of the system.

Referring now to the Figures in detail, FIG. 1 shows schematically a messaging system 10, a sending system 12 and a receiving system 14 in accordance with an embodiment of the present invention. The messaging system 10 comprises a sender agent 16, a queue 18 and a receiver agent 20. The sending system 12 includes a producing application 22 and the receiving system includes a consuming application 24. The sender agent 16 is the component by which the producing application 22 is able to communicate with the messaging system 10 and the receiver agent 20 is the component by which the consuming application 24 is able to communicate with the messaging system 10. The agents 16 and 20 are provided as part of the messaging system 10.

FIG. 1 illustrates how the producing application 22 uses the asynchronous messaging system 10 to send messages to a consuming application 24. The producing application 22 generates a message and passes the message to the messaging system 10, by invoking a "send" or "put" interface to its sender agent 16, where the sender agent 16 is a component of the messaging system 10. The messaging system 10 transports the message from the sending system 12 to the receiving system 14. The producing application 22 of the sending system 12 and the consuming application 24 of the receiving system 14 are not in direct contact and only communicate through the messaging system 10.

If necessary, the messaging system 10 queues a message on the queue 18 until the consuming application 24 is ready to receive the message. The consuming application 24 obtains the message from the messaging system 10 by invoking a "receive" or "get" interface to its receiver agent 20, where the receiver agent 20 is a component of the messaging system. In this way, if the consuming application 24 is busy, then messages will build up on the queue 18 maintained by the messaging system 10, until the consuming application 24 is free to perform further work. At that point, the consuming application 24 invokes the receiver agent 20 to obtain the oldest message available on the queue 18.

Figure 2:
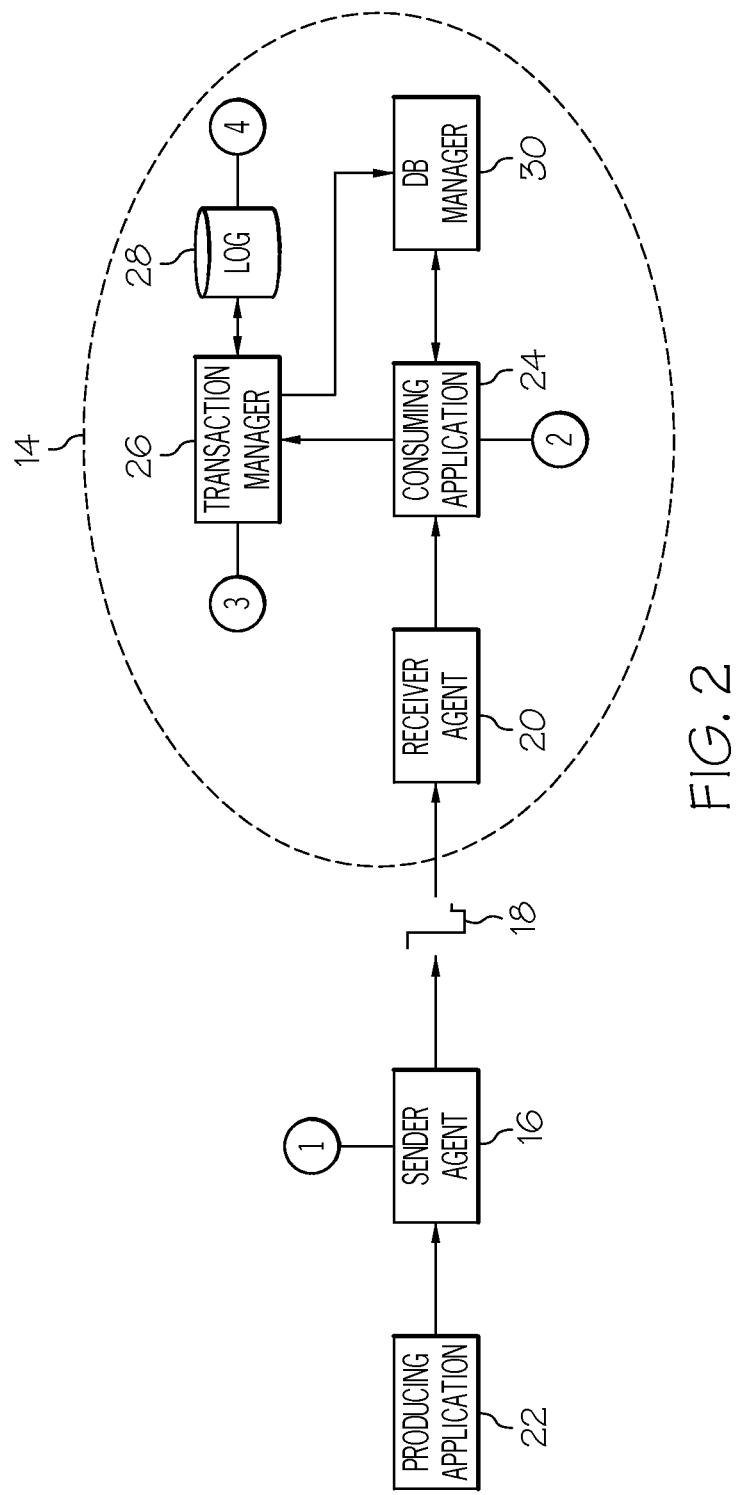
FIG. 2 is a schematic diagram of the components of the receiving system in accordance with an embodiment of the present invention.

FIG. 2 shows the components of the receiving system 14 (FIG. 1) in accordance with an embodiment of the present invention. Referring to FIG. 2, the receiving system 14 includes a transaction manager 26 which is provided with a log 28. The principal role of the transaction manager 26 is to ensure that the message received by the consuming application 24 is either processed in its entirety or not at all. In this example embodiment, the consuming application 24 is connected to a database manager 30. The example embodied in FIG. 2 could be a banking application whereby user accounts are maintained on a database that is accessed via the database manager 30. The consuming application 24 receives messages that require updating of the database 30.

FIG. 2 illustrates, in one embodiment of the present invention, use with a single producing application 22. To support multiple producing applications, the sending agent 16 also adds a producer identifier to the message, thereby providing, in effect, a separate sequence numbering for each producer. The sending agent 16 adds a sequence number to each message (step 1 in FIG. 2). This sequence number is available to the consuming application 24 as a message attribute. The sending agent 16 will sequentially add numbers to each message received from the producing application 22. This requires no change in the operation of the producing application 22, which interacts with the sender agent 16 unaware that a sequence number has been added.

The consuming application 24 invokes the receiver agent 20 to get (but not delete) a message from the queue 18, then invokes the transaction manager 26 to begin a transaction and passes the message sequence number to the transaction manager 26. The transaction manager 26 receives an invocation to begin a transaction. The consuming application 24 includes the message sequence number in the "begin transaction" call (step 2 in FIG. 2). Therefore, the transaction manager 26 receives a message sequence number for the transaction. Upon receipt, the transaction manager 26 checks that the message sequence number is greater than the last processed message sequence number that is stored in the log 28 (step 3 in FIG. 2). If the message sequence number is greater than the stored number, then the transaction manager 26 starts the transaction and remembers the received sequence number; if the number is not greater than the stored number, then the transaction manager 26 fails the begin transaction request.

If the transaction manager 26 starts the transaction, then the consuming application 24 invokes the database manager 30 to update the database, invokes the transaction manager 26 to commit the transaction, and finally invokes the receiver agent 20 to delete the message from the queue 18. If the transaction manager 26 fails the transaction, then the consuming application 24 simply invokes the receiver agent 20 to delete the message. The transaction manager 26 records the message sequence number with the decision (complete or back out) for each transaction on its log (step 4 in FIG. 2) in case the receiving system 14 fails before the consuming application 24 invokes the receiver agent 20 to delete the message. The recording of the message sequence number and the transaction decision is performed as a single write to the log.

Figure 3:
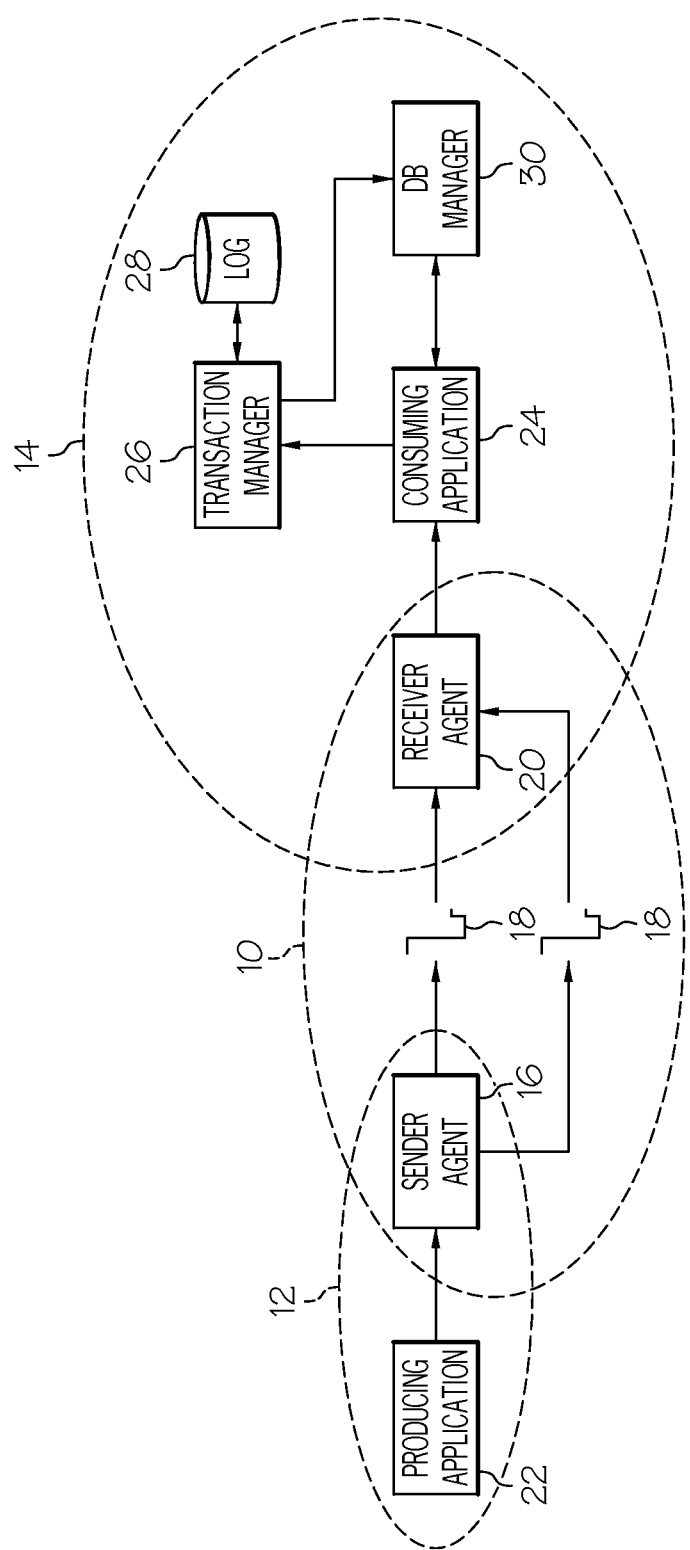
FIG. 3 is a schematic diagram of the system for processing a message using duplex queues in accordance with an embodiment of the present invention.

FIG. 3 illustrates the use of multiple queues 18 (in this example, a duplexed queue 18) in accordance with an embodiment of the present invention. It is desirable in a messaging system 10 to use multiple queues 18 in order to increase redundancy in the system. The sender agent 16 adds a sequence number to each message and transmits a copy of the message to each queue 18. When the consuming application 24 is available to perform work, the consuming application 24 invokes the receiver agent 20. The receiver agent 20 gets the message from either queue 18 and also deletes the message from both queues 18. The consuming application 24 is not aware that multiple copies of the message exist within the messaging system 10.

FIG. 3 shows an embodiment of the present invention in use with paired message queues 18. As in the previous FIG. 2, the receiving system 14 is able to identify and delete any message that has already been processed, i.e., a message with a sequence number that is less than or equal to the last processed sequence number. This allows the messaging system 10 to transport multiple (in this example, two) copies of each message using independent paths through the messaging network. Pairing message queues 18 in this way provides improved availability because the transmission of messages from the sender to the receiver can continue while one of the queues is non-functional.

For each message received by the consuming application 24, the transaction manager 26 performs the steps of checking that the message sequence number is greater than the last processed message sequence number, and if the message sequence number is greater, starting the transaction, or if the message sequence number is not greater, failing the transaction. In this way, the advantages delivered by having multiple queues 18 present in the messaging system 10 are still retained, without the disadvantage of a complicated processing burden when handling the retrying of a message that has already been processed. No additional substantial requirement is placed on the consuming application 24, which communicates with the transaction manager 26 as in a normal atomic transaction.

A convenient interface for the communication between the consuming application 24 and the transaction manager 26 is to include the message sequence number (and any originator number) as parameters on the BEGIN or START verb for the transaction manager 26. The transaction manager 26 can then reject the BEGIN or START verb with an appropriate error indication, if the message has already been processed, as indicated by the checking of the message sequence number. This allows the application to be written in the following way (note that this is a schematic representation of the program which omits many details like error processing that would be required in a real application):

```
Receive (but do not delete) a message from a queue.
Extract the originator and sequence from the message.
BEGIN TRANSACTION (originator, sequence)
IF (BEGIN returns "already processed")
    Delete the message /* this can be a lazy delete */
    Loop back to process next message
ELSE
    Process the message
    COMMIT TRANSACTION
    Delete the message /* this can be a lazy delete */
    Loop back to process next message
END
```

A lazy delete means that the actual delete of the message does not need to be carried out when requested, but can be delayed for an arbitrary amount of time. This can be convenient for the recipient of the request to delete, which can, for example, choose to wait for several such requests and then do a multiple delete of all of them at the same time. Even if the recipient fails before carrying out the delete, this does not matter much since re-delivering the message after it should have been deleted is handled by the system. The expression "lazy delete" can be used to mean marking a message as "deleted" without actually deleting the message until later. The usage here is even lazier; the message is not even marked. All that is needed is to remember that there has been a delete requested.

It will be apparent to anyone familiar with existing asynchronous messaging software that this technology provides a programming model that is very nearly as simple and intuitive as the following conventional model:

> BEGIN TRANSACTION
> Receive and delete the message from the queue /*
> the delete does not actually occur unless and
> until the transaction commits */
> Process the message
> COMMIT TRANSACTION
> Loop back to process next message The method of operating the system is also readily adapted for message-driven processing such as Java® EE message-driven beans. In message-driven programming, the consuming application does not itself issue "receive" or "get" requests for the input messages that it processes. Instead, a separate software component (a "run-time system") waits for messages. When a message arrives, the run-time system gets the message from the messaging system, activates the application, and passes the message to the application. The application processes the message, for example, updating a database, and when the processing of the message is complete, the application returns to the run-time system. An example of such a run-time system is a Java® EE application server. In adapting the system for message-driven processing, the scheme listed above is implemented in the run-time system and the line "process the message" stands for "activate the application, and pass the message to the application." For this message-driven case, the application itself is identical for the old and new transactional models, where the differences are all in the run-time system. (Java and all Java-based trademarks and logos are trademarks of Sun Microsystems, Inc. in the United States, other countries, or both.)

As indicated, the primary intention of the system disclosed above is to complement high-throughput high-availability messaging system designs. However, the system provides benefits even when not used with high-throughput high-availability messaging system designs. For example, performance in the messaging system 10 is improved because the messaging system 10 is not included as a resource manager in the receiving application's transaction. Secondly, performance in the messaging system 10 is improved because a lazy delete can be used instead of an out-of-syncpoint destructive get (which is, in effect, a transaction). In prior systems, when a message is retrieved from a queue 18 where there exists duplexing, such that the message is present on two queues 18 simultaneously, a destructive get has to be used in a transactional operation to ensure that both instances of the message are removed in the same operation. However, since the improved system can easily handle the duplicate delivery of a message, there is no need to use the complex transactional destructive get, and a simple lazy delete can be used instead as if this fails, the later second delivery of the same message is easily dealt with. Thirdly, performance in the receiving application 24 can potentially benefit from a one phase commit optimization of its transaction, if excluding the messaging system reduces the number of resource managers to one.

In the above, it is assumed that there is a separate transaction manager which implements an interface such as the extended BEGIN or START verb syntax. However, the same model can be used where there is a single transactional resource, for example, a relational database, provided that that resource supports an interface, such as the extended BEGIN or START verb syntax, and thereby operates as a transaction manager.

This specific handling required can be implemented within the transaction manager 26 in a number of different ways. A description of an example implementation follows. In this description, it is assumed that the information to be retained by the transaction manager 26 is a unique identifier for the originator of a message (the same value for all messages from that originator) and a sequence number (incremented for each consecutive message from that originator). Different users of the system will have different requirements. For example, one application might require that all messages are delivered in sequence with no "missed" sequence numbers, whereas, another application might tolerate missing some messages. These differing requirements can be met by providing different return codes for conditions that might or might not be treated as errors by the invoking application 24.

The transaction manager 26 maintains a table which can be called a "last message processed table" with entries that are indexed or keyed (or both) by the originator ID and that contain the sequence number of the most recently processed (committed) message, and, if applicable, the sequence number of the currently in-process message. As an example, this might be implemented as an in-memory hash table. When an application 24 (or other agent acting on behalf of the application, such as a Java® EE container) issues BEGIN (or START or other equivalent verb), the transaction manager 26 checks the last message processed table entry for the specified originator.

Several different results of the check are possible. Firstly, there is no entry for the specified originator. In this case, the transaction manager 26 creates an entry, adds the specified (new) sequence number into that new entry as the currently in-process message, starts the transaction in the usual way, and returns to the application with an "OK" return code. Secondly, the entry contains the sequence number of a currently in-process message. In this case, the transaction manager 26 does not start a transaction; instead, it returns a "busy" return code. Thirdly, the new sequence number is less than or equal to the most recently processed message sequence number. In this case, the transaction manager 26 does not start a transaction; instead, it returns an "already processed" return code. Fourthly, the new sequence number is exactly one more than the most recently processed message sequence number. In this case, the transaction manager 26 adds the new sequence number into the entry as the currently in-process message, starts the transaction in the usual way, and returns to the application with an "OK" return code. Finally, the new sequence number is more than one more than the most recently processed message sequence number. In this case, the transaction manager 26 adds the new sequence number into the entry as the currently in-process message, starts the transaction in the usual way, and returns to the application with a "missing sequence number" return code.

When an application 24 (or other agent acting on behalf of the application, such as a Java® EE container) issues a BACKOUT (or ROLLBACK or other equivalent verb) or implicitly initiates equivalent processing by terminating abnormally, then the transaction manager 26 removes the corresponding currently in-process message sequence number from the last message processed table, backs out the transaction in the usual way, and returns to the application. When an application 24 (or other agent acting on behalf of the application, such as a Java® EE container) issues a COMMIT (or other equivalent verb) or implicitly initiates equivalent processing by terminating normally, then the transaction manager 26 replaces the corresponding most recently processed message sequence number with the currently in-process message sequence number, clears the currently in-process message, commits the transaction in the usual way, and returns to the application.

Updates to the last message processed table only occur at the time of transaction state changes and are atomic with those transaction state changes. This means the information related to these updates can be included in the transaction state transition records that the transaction manager 26 already writes to its transaction log 28.

Figure 4:
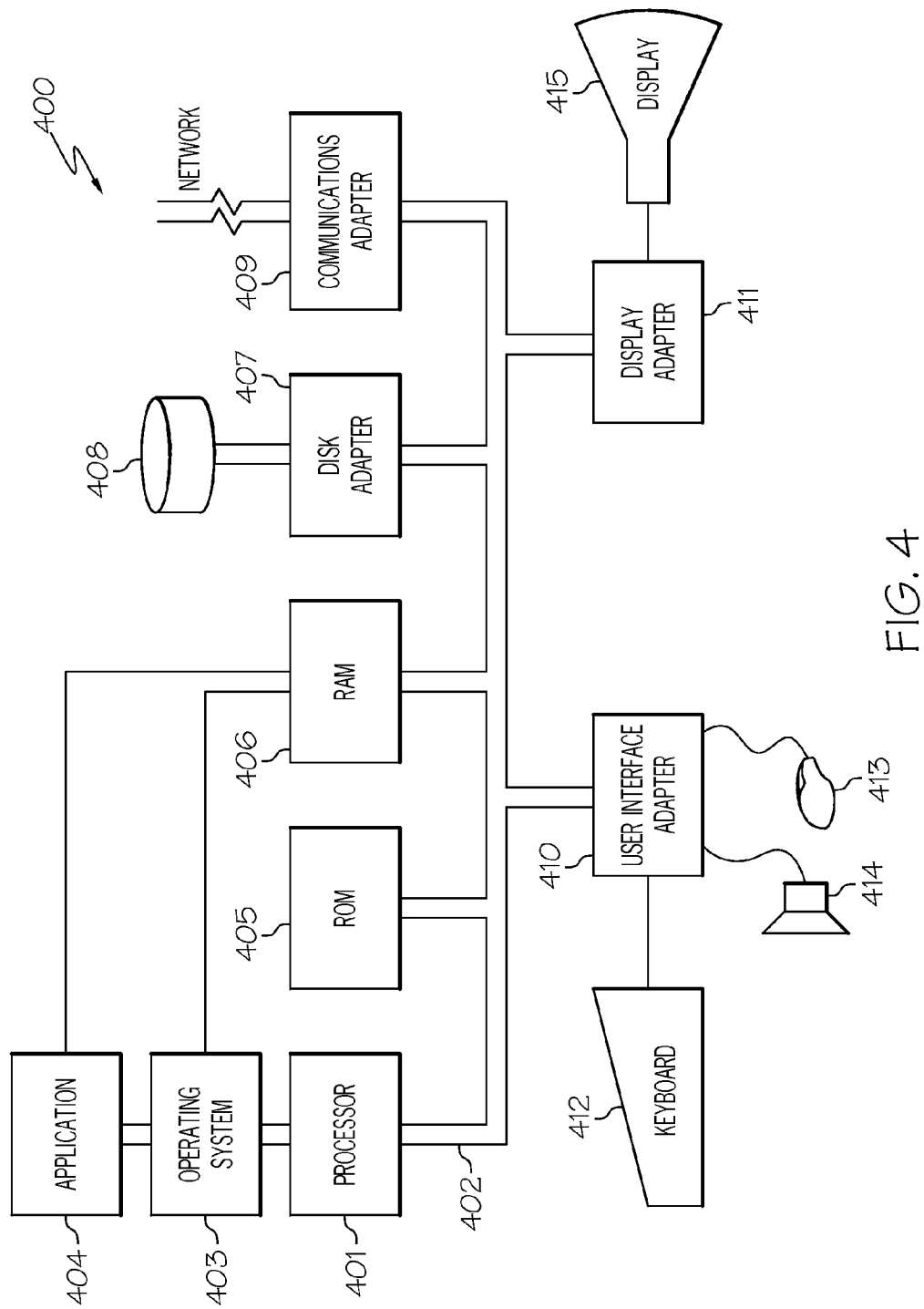
FIG. 4 depicts an embodiment of a hardware configuration of a computer system which is representative of a hardware environment for practicing the present invention.

FIG. 4 depicts an embodiment of a hardware configuration of a computer system 400 which is representative of a hardware environment for practicing the present invention. Referring to FIG. 4, computer system 400 has a processor 401 coupled to various other components by system bus 402. An operating system 403 may run on processor 401 and provide control and coordinate the functions of the various components of FIG. 4. An application 404 in accordance with the principles of the present invention may run in conjunction with operating system 403 and provide calls to operating system 403 where the calls implement the various functions or services to be performed by application 404. Application 404 may include, for example, an application for operating a transaction manager as discussed above.

Referring again to FIG. 4, read-only memory ("ROM") 405 may be coupled to system bus 402 and include a basic input/output system ("BIOS") that controls certain basic functions of computer device 400. Random access memory ("RAM") 406 and disk adapter 407 may also be coupled to system bus 402. It should be noted that software components including operating system 403 and application 404 may be loaded into RAM 406, which may be computer system's 400 main memory for execution. Disk adapter 407 may be an integrated drive electronics ("IDE") adapter that communicates with a disk unit 408, e.g., disk drive.

Computer system 400 may further include a communications adapter 409 coupled to bus 402. Communications adapter 409 may interconnect bus 402 with an outside network (not shown) thereby allowing computer system 400 to communicate with other similar devices.

I/O devices may also be connected to computer system 400 via a user interface adapter 410 and a display adapter 411. Keyboard 412, mouse 413 and speaker 414 may all be interconnected to bus 402 through user interface adapter 410. Data may be inputted to computer system 400 through any of these devices. A display monitor 415 may be connected to system bus 402 by display adapter 411. In this manner, a user is capable of inputting to computer system 400 through keyboard 412 or mouse 413 and receiving output from computer system 400 via display 415 or speaker 414.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of operating a transaction manager, the method comprising:
   receiving multiple copies of a message using independent paths through a messaging network, wherein each of said independent paths comprises a queue;
   receiving an invocation to begin a transaction;
   receiving a message sequence number for the transaction;
   checking, by a processor, that the message sequence number is greater than a last processed message sequence number for each message received;
   starting the transaction in response to the message sequence number being greater than the last processed message sequence number;
   failing the transaction in response to the message sequence number being less than the last processed message sequence number;
   invoking a receiver agent by a consuming application to delete a message associated with the message sequence number in response to failing the transaction;
   receiving an original identifier for the transaction; and
   detecting that there is no message sequence number stored for the message associated with the original identifier, and, in response, storing the message sequence number for the message associated with the original identifier.

2. The method according to claim 1 further comprising:
   recording the message sequence number and a decision to complete or backout the transaction as a single write to a log.

3. The method according to claim 1 further comprising:
   detecting that the message sequence number is greater than one more than the last processed message sequence number and reporting a missing message sequence number.

4. The method according to claim 1 further comprising:
   detecting that the message sequence number is equal to a message sequence number for an invoked transaction that is not yet complete and reporting a busy code.

5. A computer program product embodied in a computer readable storage medium, wherein the medium does not include a propagating signal, for operating a transaction manager, the computer program product comprising the programming instructions for:
   receiving multiple copies of a message using independent paths through a messaging network, wherein each of said independent paths comprises a queue;
   receiving an invocation to begin a transaction;
   receiving a message sequence number for the transaction;
   checking that the message sequence number is greater than a last processed message sequence number for each message received;
   starting the transaction in response to the message sequence number being greater than the last processed message sequence number;
   failing the transaction in response to the message sequence number being less than the last processed message sequence number;
   invoking a receiver agent by a consuming application to delete a message associated with the message sequence number in response to failing the transaction;
   receiving an original identifier for the transaction; and
   detecting that there is no message sequence number stored for the message associated with the original identifier, and, in response, storing the message sequence number for the message associated with the original identifier.

6. The computer program product according to claim 5 further comprising the programming instructions for:
   recording the message sequence number and a decision to complete or backout the transaction as a single write to a log.

7. The computer program product according to claim 5 further comprising the programming instructions for:
   detecting that the message sequence number is greater than one more than the last processed message sequence number and reporting a missing message sequence number.

8. The computer program product according to claim 5 further comprising the programming instructions for:
   detecting that the message sequence number is equal to a message sequence number for an invoked transaction that is not yet complete and reporting a busy code.

9. A system, comprising:
   a memory unit for storing a computer program for operating a transaction manager; and
   a processor coupled to the memory unit, wherein the processor, responsive to the computer program, comprises:
      circuitry for receiving multiple copies of a message using independent paths through a messaging network, wherein each of said independent paths comprises a queue;
      circuitry for receiving an invocation to begin a transaction;
      circuitry for receiving a message sequence number for the transaction;
      circuitry for checking that the message sequence number is greater than a last processed message sequence number for each message received;

circuitry for starting the transaction in response to the message sequence number being greater than the last processed message sequence number;

circuitry for failing the transaction in response to the message sequence number being less than the last processed message sequence number;

circuitry for invoking a receiver agent by a consuming application to delete a message associated with the message sequence number in response to failing the transaction;

circuitry for receiving an original identifier for the transaction; and circuitry for detecting that there is no message sequence number stored for the message associated with the original identifier, and, in response, storing the message sequence number for the message associated with the original identifier.

10. The system according to claim 9, wherein the processor further comprises:

circuitry for recording the message sequence number and a decision to complete or backout the transaction as a single write to a log.

11. The system according to claim 9, wherein the processor further comprises:

circuitry for detecting that the message sequence number is greater than one more than the last processed message sequence number and reporting a missing message sequence number.

12. The system according to claim 9, wherein the processor further comprises:

circuitry for detecting that the message sequence number is equal to a message sequence number for an invoked transaction that is not yet complete and reporting a busy code.

\* \* \* \* \*